United States Patent [19]

Brown

[11] 4,141,046
[45] Feb. 20, 1979

[54] FLOPPY DISC DATA SEPARATOR FOR USE WITH SINGLE DENSITY ENCODING

[75] Inventor: W. Sumner Brown, Cambridge, Mass.

[73] Assignee: Exxon Research & Engineering Co., Florham Park, N.J.

[21] Appl. No.: 833,268

[22] Filed: Sep. 14, 1977

[51] Int. Cl.² .............................................. G11B 5/02
[52] U.S. Cl. ...................................................... 360/51
[58] Field of Search ...................... 360/51, 41, 42, 43; 178/69.1; 328/99, 120

[56] References Cited

U.S. PATENT DOCUMENTS

| | | | |
|---|---|---|---|
| 3,382,492 | 5/1968 | Santana | 360/51 |
| 3,810,234 | 5/1974 | Monett | 360/51 |
| 3,887,942 | 6/1975 | Horowitz | 360/51 |
| 3,944,940 | 3/1976 | Desai | 360/51 |
| 4,012,697 | 3/1977 | Ballinger | 178/69.1 |
| 4,040,022 | 8/1977 | Takii | 360/51 |
| 4,053,944 | 4/1976 | Dixon | 360/51 |

*Primary Examiner*—Vincent P. Canney
*Attorney, Agent, or Firm*—N. Norris

[57] ABSTRACT

A data separator circuit for use in decoding single density encoded data retrieved from a floppy disc, the circuit comprising a phased lock loop edge aligning circuit in combination with logic circuitry for providing a first output of separated data and a second output of the separated clock signals. The separator circuit generates an approximately periodic data window which is held in phased alignment with respect to the approximately periodic clock signal, the data window being utilized to gate out, or separate out only the single density encoded data.

11 Claims, 2 Drawing Figures

FLOPPY DISC DATA SEPARATOR FOR USE WITH SINGLE DENSITY ENCODING

BACKGROUND OF THE INVENTION

This invention relates to detection of single density encoded data, and more particularly to utilizing a phased lock loop circuit for data separating wherein the rate of data flow might be susceptible to substantial variations.

The subject invention is designed for efficient and easy data separation of a data signal from a storage medium such as a floppy disc. It is particularly adapted for separating "single density encoded" data, wherein a single data bit is encoded between successive clock pulses. This data scheme is a prevalent scheme for encoding data on floppy discs. While other arrangements have been utilized, such as schemes having the clocks and data condensed, and higher density encoding is possible, this arrangement presents a favorable compromise, or trade-off, of various system considerations. The single density encoding arrangement enables relatively simple circuitry for use in conjunction with the floppy disc. However, in the prior art this arrangement has been vulnerable to system performance variations, and in particular variations in the speed of the motor that drives the floppy disc. In short, if the motor drive of the floppy disc experiences speed changes, there are resulting time variations in the data flow from the floppy disc pickup, resulting time variations must be accounted for in the data separating circuitry. A typical conventional separator circuit comprises a series of monostable multivibrators which are sensitive to the timing of the received signals, and which require adjustment when and if there occur variations in the rate of data flow from the floppy disc pickup. Such prior art separator systems, because they are sensitive to the timing, make it difficult to achieve the degree of reliability that is required for the overall system.

SUMMARY OF THE INVENTION

It is an object of this invention to provide a data separator for separating the data from a single density encoded signal, which separator circuit is simple and reliable, and relatively immune to variations in the rate of the data signal being operated upon.

It is another object of this invention to provide a circuit for separating data from a single density encoded signal, comprising a phase lock loop circuit in combination with logic circuitry to provide a separator circuit which automatically adjusts to maintain proper alignment when variations occur in the rate of the encoded signal.

It is another object of this invention to provide a data separating circuit for use in conjunction with a floppy disc type storage device, the separator circuit being designed to receive signals from the storage device and to separate the encoded data from the clock pulses, the separator circuit being relatively insensitive to variations in the rate of the signal caused by system variations such as changes in the speed of the floppy disc drive.

It is a further object of this invention to provide a data separator for separating data from a signal containing periodic clock pulses and encoded data, which data separator is simple, reliable and is adaptive to remain time synchronized with the clock pulses in the signal.

In accordance with the above objectives, there is provided a circuit for separating data from an encoded signal, and in particular a single density encoded signal, comprising a circuit for tracking or following the timing of the clock pulses in such signal, and further circuit means for generating a data window which is maintained in time coincidence with the occurrence of the encoded data and not in time coincidence with the occurrence of the clock signals, and gating means utilizing the data window to gate only the encoded data, thereby separating the encoded data from the clock pulses in the signal. In the preferred embodiment, the data separator utilizes a phase lock loop circuit and accompanying logic circuitry to track any variations in the rate of the clock signals, thereby continuously maintaining the proper time relationship, or alignment, between the data window and the encoded data, thereby ensuring proper data separation independently of variations in the rate of the encoded signal.

DETAILED DESCRIPTION OF THE PREFERRED EMBODIMENT

Figure 1:
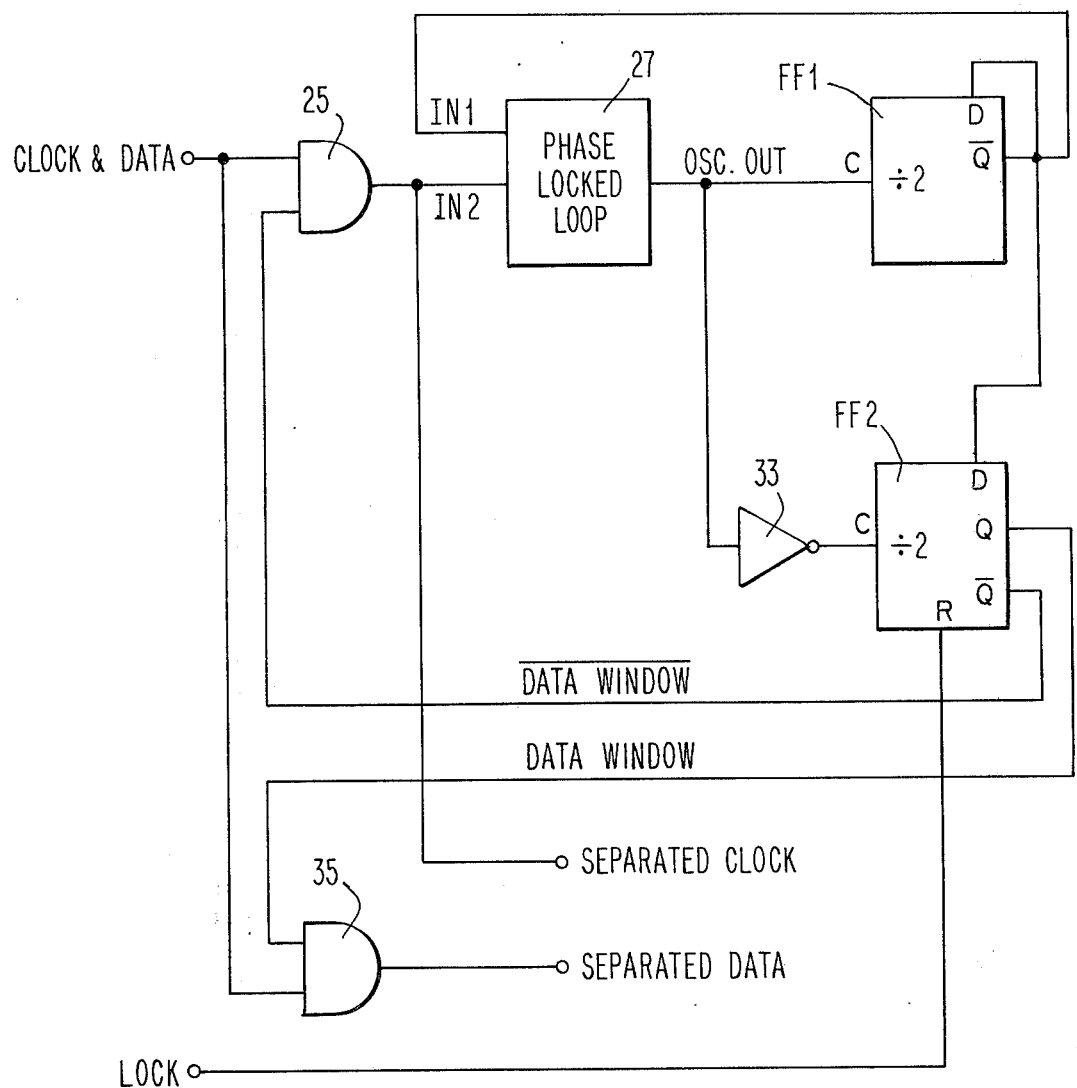
FIG. 1 is a circuit diagram of the data separator of this invention.

Referring now to FIG. 1, there is shown a circuit diagram of the data separator of this invention. The circuit has two inputs, labeled CLOCK & DATA and LOCK respectively. There are two output terminals, labeled SEPARATED DATA and SEPARATED CLOCK respectively. The CLOCK & DATA waveform is illustrated on the CLOCK & DATA line, FIG. 2, it being seen that the single density encoded waveform has alternating clock and data signals. The CLOCK & DATA signal is provided from the read head of a floppy disc, not shown, and is connected to the circuit of this invention after desirable amplification and other processing. As seen in the CLOCK & DATA line of FIG. 2, the clock signal is a periodic high level pulse, and the data signal is either in the form of a high level pulse representing a 1 or the absence of a pulse representing a 0, the data signal occurring nominally midway between successive clock signals.

Figure 2:
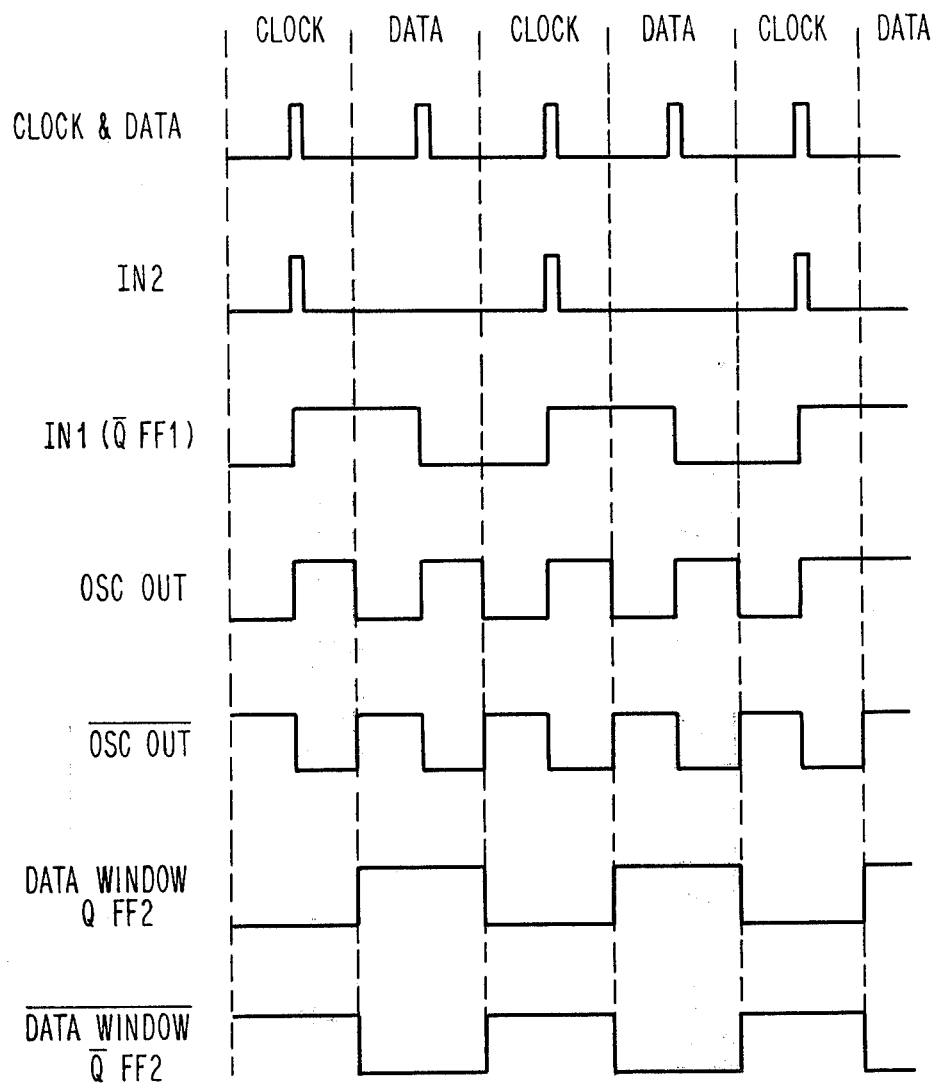
FIG. 2 comprises a plurality of waveform diagrams illustrating signal levels at specified points of the circuit of FIG. 1.

The CLOCK & DATA signal is inputted into a first input terminal of AND gate 25. The second input to gate 25 represents the DATA WINDOW signal, which is generated as described hereinbelow. The CLOCK & DATA signal is also inputted to a first input terminal of AND gate 35, which gate has a second terminal to which is connected the DATA WINDOW signal. As seen in FIG. 2, the dashed lines break up the clock plus data signal, timewise, into successive equal portions which correspond to the DATA WINDOW and the DATA WINDOW respectively. The DATA WINDOW is centered about the time when the data signal is scheduled to appear, and the DATA WINDOW is centered about the clock pulses, as is seen from the DATA WINDOW and DATA WINDOW waveforms.

The output of gate 25, which is defined as being the separated clock signal, is inputted as IN 2 to phase locked loop circuit 27. Phase locked loop circuit 27 is suitably provided by Motorola Integrated Circuit MC 14046B. A second input to phase locked loop circuit 27, IN 1, is taken from the Q output of FF 1, and represents a squarewave having its rising edge aligned with the leading edge of the input clock signal, as seen in FIG. 2. The output of circuit 27, designated OSC. OUT, is a periodic signal at about twice the frequency of the clock pulse, with the rising edge of the OSC. OUT signal being aligned with the rising edge of the clock pulses. The OSC. OUT signal is inputted to the clock input of FF 1, which is a conventional D-type flip-flop connected to act as a divide-by-two circuit. Additionally, the OSC. OUT signal is inverted through inverter 33 and connected to the clock input terminal of FF 2, which is likewise a D-type flip-flop utilized to perform the divide-by-two function. The Q output of FF 2, which is the data window signal, is connected to gate 35 as described above, to gate through only the data component of the CLOCK & DATA signal, while the Q output of FF 2, which is the DATA WINDOW signal, is connected to an input of gate 25 to gate only the clock signal through to phase locked loop circuit 27.

The lock signal, which represents the beginning of a floppy disc sector, is connected to the rest terminal of FF 2. In conventional operation of floppy discs, a first plurality of the data positions of a new sector are filled with 0's, and the lock signal is generated, suitably with a monostable flip-flop, to be high for about 25% of the "zeros" time. The high lock signal causes FF 2 to reset at the beginning of the sector, thereby causing all data to be interpreted as clock signals for the duration of the reset period. Note that when FF 2 is reset, Q is high and Q is low, so that the DATA WINDOW line remains high and all signals entered at the CLOCK & DATA input terminal are passed through on the IN 2 line. This causes the timing of the circuit to be referenced to clock signals, establishing the relationships shown in the waveforms of FIG. 2. Note that during this period the Q terminal of FF 2 is low, such that nothing gets gated through gate 35, and no signal appears at the SEPARATED DATA terminal.

In operation, when a high signal, or pulse is gated through gate 25, it is inputted to phase locked loop circuit 27. Circuit 27 contains a comparator which compares signals IN 1 and IN 2, and produces a tristated output, i.e., high, low, or free. The output of the comparator is connected through a low pass filter to a VCO circuit which normally produces a pulse signal. If the output from the comparator is "high", the output frequency (OSC. OUT) increases; if "low", OSC. OUT decreases; and if "free", OSC. OUT remains unchanged. The time relationship of the clock pulses with the IN 1 signal causes edge alignment of the clock signals and the OSC. OUT signals, which alignment in turn fixes the relationship of the DATA WINDOW signal relative to the clock pulses. The OSC. OUT is the clock input to FF 1, causing FF 1 to change state when OSC. OUT goes high. When the OSC. OUT signal goes low, the clock signal to FF 2, which has been inverted, goes high, causing FF 2 to change state. When this happens, the DATA WINDOW signal, at the Q output of FF 2, and the DATA WINDOW at the Q terminal of FF 2, change state. These conditions hold for a full cycle of the OSC. OUT waveform, at which time FF 1 is again switched. A low level signal connected to the D input terminal of FF 2, combined with a positive transition of the OSC. OUT signal changes the DATA WINDOW signal to a low level and the DATA WINDOW signal to a high level. The procedure is repeated, and as seen from the waveform of FIG. 2, the leading edge of the IN 1 signal being aligned with the leading edge of each clock pulse. The data window is centered about the occurrence of the data signal, while the DATA WINDOW signal is centered about the clock pulses. Changes in the rate of the CLOCK & DATA signal are tracked by circuit 27, causing a corresponding adjustment of the timing of the DATA WINDOW. Thus, the phase locked loop circuit optimally positions the DATA WINDOW with respect to the CLOCK & DATA pulses. The DATA WINDOW is always maintained centered between the clock pulses, and accordingly the system is not vulnerable to variations in the performance of the drive motor which drives the floppy disc. The circuit thus renders the overall floppy disc system tolerant of wide variations in disc drive rotary motor speed.

It will be understood that a preferred embodiment of the invention has been shown and described and various modifications may be made which fall within the true spirit and scope of the invention as set forth in the appended claims. For example, the separator circuit may be arranged to act upon a CLOCK & DATA signal wherein the pulses are negative going, i.e., the signal is normally high and goes low at the time of a clock or data pulse. In such case, negative logic is employed, gates 25 and 35 being NOR gates instead of AND gates. The signal from the Q terminal of FF 2 is DATA WINDOW and the signal from the Q terminal of FF 2 is DATA WINDOW, such that DATA WINDOW is periodically high coincident with the data in the signal and periodically low coincident with the clock pulses.

What is claimed is:

1. A circuit for separating data from a data encoded signal consisting of clock pulses and data positioned therebetween, comprising:
   data window means for generating as outputs a data window signal and the inverse thereof, said data window means having an input for receiving said clock pulses and including means or automatically adjusting the timing of said data window signal in response to changes in the timing of said clock pulses, whereby said data window signal is continuously maintained in a predetermined time relationship to said clock pulses,
   input gate means connected to an output of said data window means for receiving said data encoded signal and gating only said clock pulses to said data window means input, and
   gating means for separating said data from said clock pulses, comprising a gate circuit and connecting means connecting said data encoded signal and said data window signal thereto.

2. The circuit as described in claim 1, wherein said data encoded signal is a single density encoded signal, said data window signal is periodically high coincident with the data in said signal and periodically low coincident with said clock pulses, and said gate circuit comprises an and gate.

3. The circuit as described in claim 1, wherein said data window means comprises a phase locked loop circuit for providing a signal output which is aligned with said clock pulses.

4. The circuit as described in claim 3, comprising sector lock means for resetting said circuit upon receipt of a signal representing the start of a floppy disc sector.

5. A circuit for separating data and clock signals from a single density encoded signal, comprising:

a phase locked loop circuit, having two inputs, and providing a pulse oscillator output;

first logic means for producing a first logic signal in time alignment with said oscillator output, having an input connected to receive said oscillator output, and a connecting circuit for connecting said first logic signal to one of said phase locked loop circuit inputs;

second logic means having an input connected to receive said oscillator output, for generating second and third logic signals in time alignment with said oscillator output;

first gate circuit means for providing separated clock signals having a first input connected to receive said single density encoded signal and a second input connected to receive said third logic signal, and an output connected to a second input of said phase locked loop circuit at which is provided the separated clock signals; and second gate circuit means for providing separated data signals having a first input connected to receive said single density encoded signal and a second input connected to receive said second logic signal, and an output terminal at which is provided the separated data signals derived from said encoded signal.

6. The circuit as described in claim 5, wherein said first logic means comprises a first divide-by-two flip-flop, and said second logic means comprises an inverter circuit connected to the clock input of a second divide-by-two flip-flop.

7. The circuit as described in claim 6, wherein said flip-flops are D-type flip-flops, and the D terminals are connected in common.

8. The circuit as described in claim 5, wherein said second logic signal is in time coincidence with the data signals in said encoded signal and said third logic signal is in time coincidence with the clock signals in said encoded signal.

9. The circuit as described in claim 8, wherein said phase locked loop circuit keeps said pulse oscillator output in edge alignment with said clock signals.

10. A system for separating data from a single density encoded signal having clock pulses at a rate subject to some variation, comprising:

a phase locked loop circuit having a comparator and a variable frequency oscillator, said circuit operating to edge align the output of said oscillator with signals inputted to said circuit, input means for inputting only said clock pulses to said circuit, whereby said oscillator output is edge aligned with said clock pulses, means connected to receive said oscillator output for generating a periodic data window signal which is continuously and automatically adjusted to maintain a predetermined alignment with said clock pulses when the rate of said clock pulses varies, and means for gating said encoded signal with said data window signal to separate the data in said encoded signal from said clock pulses.

11. The circuit as described in claim 1, comprising second gating means for separating said clock pulses from said encoded signal.

* * * * *